United States Patent
Funke et al.

(10) Patent No.: US 11,850,995 B2
(45) Date of Patent: Dec. 26, 2023

(54) HEADLIGHT FOR A VEHICLE HAVING PIXEL LIGHT SOURCE MODULES FORMING VERTICALLY DISPOSED LIGHT PATTERNS

(71) Applicant: AUDI AG, Ingolstadt (DE)

(72) Inventors: Carsten Funke, Ingolstadt (DE); Thomas Haug, Ingolstadt (DE); Tilman Armbruster, Ingolstadt (DE); Michael Hamm, Eningen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/924,468

(22) PCT Filed: Apr. 6, 2021

(86) PCT No.: PCT/EP2021/058874
§ 371 (c)(1),
(2) Date: Nov. 10, 2022

(87) PCT Pub. No.: WO2021/228469
PCT Pub. Date: Nov. 18, 2021

(65) Prior Publication Data
US 2023/0085794 A1 Mar. 23, 2023

(30) Foreign Application Priority Data
May 12, 2020 (DE) ...................... 10 2020 112 844.4

(51) Int. Cl.
*F21S 41/153* (2018.01)
*B60Q 1/12* (2006.01)
*B60Q 1/00* (2006.01)

(52) U.S. Cl.
CPC ............. *B60Q 1/12* (2013.01); *B60Q 1/0041* (2013.01); *F21S 41/153* (2018.01)

(58) Field of Classification Search
CPC ..................................................... F21S 41/153
See application file for complete search history.

(56) References Cited

U.S. PATENT DOCUMENTS

2018/0010755 A1 * 1/2018 Park ....................... B60Q 1/085

FOREIGN PATENT DOCUMENTS

| DE | 10 2005 041 234 A1 | 3/2007 |
| DE | 10 2015 207 432 A1 | 10/2015 |
| DE | 10 2014 216 545 A1 | 2/2016 |
| DE | 10 2017 128 125 A1 | 5/2019 |
| EP | 1 980 447 A1 | 10/2008 |
| EP | 2 037 167 A2 | 3/2009 |
| EP | 2 532 950 A1 | 12/2012 |

(Continued)

OTHER PUBLICATIONS

International Search Report dated Jun. 7, 2021 for International Application No. PCT/EP2021/058874.

(Continued)

*Primary Examiner* — Robert J May
(74) *Attorney, Agent, or Firm* — STAAS & HALSEY LLP (57) ABSTRACT

Two headlights are spaced apart from each other in the transverse direction of a vehicle in which they are installed. When the headlights are in position to simultaneously provide light patterns, a first light pattern is located at least partially above a second light pattern in the vertical direction with respect to the installation position of the headlights.

15 Claims, 2 Drawing Sheets

(56) References Cited

FOREIGN PATENT DOCUMENTS

| EP | 3 267 097 A1 | 1/2018 |
| EP | 3 689 678 A1 | 8/2020 |
| JP | 2015-118833 A | 6/2015 |
| WO | 2016/083689 A1 | 6/2016 |
| WO | 2020/207610 A1 | 10/2020 |

OTHER PUBLICATIONS

Translation by WIPO of International Preliminary Report on Patentability for International Appl. No. PCT/EP2021/058874 dated Nov. 17, 2022.
PCT/EP2021/058874, Apr. 6, 2021, Carsten Funke.
10 2020 112 844.4, May 12, 2020, Carsten Funke.

* cited by examiner

HEADLIGHT FOR A VEHICLE HAVING PIXEL LIGHT SOURCE MODULES FORMING VERTICALLY DISPOSED LIGHT PATTERNS

CROSS REFERENCE TO RELATED APPLICATIONS

This application is a U.S. national stage of International Application No. PCT/EP2021/058874, filed on Apr. 6, 2021. The International Application claims the priority benefit of German Application No. 10 2020 112 844.4 filed on May 12, 2020. Both the International Application and the German Application are incorporated by reference herein in their entirety.

BACKGROUND

Described below is a headlight device for a vehicle, in particular for a motor vehicle, and the motor vehicle itself, as well as a method for operating a headlight device of a vehicle.

DE 10 2010 006 296 A1 discloses a method for low beam control of a vehicle with at least one pivotable headlight. A method for controlling a headlight assembly for a vehicle can be taken as known from DE 10 2008 053 945 A1. In addition, a method for controlling a headlight assembly for a vehicle is known from DE 10 2015 221 810 A1.

In addition, DE 10 2015 207 432 A1 discloses an illumination control system for controlling illumination by means of a lamp installed on a vehicle, which includes a light source, a sweeping control unit for periodically changing positions of regions, which are illuminated with light emitted by the light source, as well as an illumination control unit. Furthermore, a vehicle headlight with a principal light module to emit a principal light beam, and with a plurality of additional illumination modules to emit a complementary light beam, can be taken as known from WO 2016/083689 A1. In addition, EP 2 037 167 A1 discloses an illumination unit for a vehicle front headlight.

SUMMARY

Described below are a headlight device for a vehicle, a vehicle as well as a method such that a particularly advantageous illumination of at least a part of an environment of the vehicle can be realized.

A first aspect relates to a headlight device for a vehicle, in particular for a motor vehicle. This means that the vehicle includes the headlight device in its completely produced state. For example, the vehicle is formed as a motor vehicle, in particular as a car and therein, e.g., as a passenger car. The headlight device can be arranged on the front or else on the rear of the vehicle. The headlight device includes, in particular at least or exactly, two headlights spaced apart from each other in vehicle transverse direction in installation position of the headlight device. If the headlight device is arranged on the front of the vehicle, the headlights are for example front headlights. If the headlight device is for example arranged on the rear of the vehicle, thus, the headlights are for example rear headlights or taillamps. The headlight device occupies its installation position in completely produced state and in particular if the vehicle stands on a horizontal plane in its completely produced state, wherein the vehicle is supported on the plane towards the bottom in vehicle height direction or in vertical direction for example via its ground contact elements. The respective ground contact element is for example a wheel also referred to as vehicle wheel. In particular, the installation position of the headlight device is a position of the headlight device provided for the intended use of the headlight device.

The headlights are formed to simultaneously provide a respective light pattern. In other words, a first one of the headlights is for example formed to provide a first light pattern, wherein the second headlight is formed to provide a second light pattern. Therein, the headlights can simultaneously provide the first light pattern and the second light pattern. The respective light pattern is formed by respective light, which is or is to be provided by the respective headlight. In other words, in order to provide, that is to generate or radiate, the respective light pattern, the respective headlight provides light, that is the respective headlight radiates light, wherein the respective light pattern is formed from the light. In particular, the respective light pattern is such a light pattern, which, if the respective headlight provides its respective light pattern or if the headlights simultaneously provide the light patterns, is formed or generated at or on a surface and thus is for example optically perceivable by a person with his human eyes, wherein the surface is spaced apart from the vehicle or from the respective headlight by at least five meters, in particular at least or exactly ten meters, in vehicle longitudinal direction or in horizontal direction, and thus is arranged in front of or behind the vehicle or the respective headlight by at least five meters in horizontal direction or in vehicle longitudinal direction, which for example coincides with the horizontal direction. Therein, the surface extends in vertical direction and thus perpendicularly to the horizontal direction, wherein the surface is flat or planar.

Now, in order to be able to illuminate at least a part of an environment of the headlight device and thus of the vehicle in particularly advantageous and adequate manner by the light patterns or by the headlight device, it is provided that in simultaneous provision of the light patterns, that is if the headlights simultaneously provide the light patterns, a first one of the light patterns is arranged at least partially above the second light pattern in vertical direction related to the installation position of the headlight device. Hereby, it is in particular to be understood that at least a part of the first light pattern is arranged above at least a part of the second light pattern in vertical direction and thus for example in vehicle height direction, which can coincide with the vertical direction, wherein a light pattern region, in which at least the part of the first light pattern is arranged, is free from the second light pattern such that the second light pattern is not located in the light pattern region. Therein, the light pattern region is for example arranged above at least the part of the second light pattern or above the second light pattern in vertical direction. Further, it may be provided that a second light pattern region, in which the part of the second light pattern is arranged, is free from the first light pattern, such that the first light pattern is not arranged in the second light pattern region. It may be provided that at least the part of the first light pattern is arranged above the entire second light pattern in vertical direction. In order to be able to simply and clearly distinguish the parts of the light patterns in the following, the part of the first light pattern is also referred to as first part of the first light pattern and the part of the second light pattern is also referred to as second part of the second light pattern.

The feature that the first part is arranged above the second part of the light pattern in vertical direction or in vehicle height direction in simultaneous provision of the light patterns, related to the previously mentioned surface for example formed by a wall, means that if the light patterns are generated on the surface or can be optically perceived on the surface, the first part is arranged above the second part in vertical direction or in vehicle height direction. Put the other way round, at least the second part of the second light pattern is below at least the first part of the first light pattern in vertical direction. The feature that at least the first part of the first light pattern is arranged above at least the second part of the second light pattern in vertical direction, can in particular include that a centroid of an area and/or an optical axis of the first light pattern are arranged above a centroid of an area and/or an optical axis of the second light pattern in vertical direction. Therein, the respective light pattern, viewed as a whole or in complete manner, is for example an area which in particular includes the respective centroid of an area.

The respective headlight is a pixel light source formed as a light module such that the respective light pattern can be formed by a plurality of image dots, which can be provided by the respective headlight, wherein the respective headlight includes a plurality of LEDs, by which the image dots can be generated. In particular, the following can be understood thereby: The respective headlight is a light module simply also referred to as module. The respective headlight is a pixel light source such that the respective light pattern is formed by a plurality of image dots or pixels, which are provided or generated by the respective headlight. Hereto, the respective headlight includes a plurality of LEDs, which generate the respective light pattern or the image dots.

In particular, described herein are headlight devices for vehicles, wherein the headlight devices are also referred to as illumination devices, are usually always symmetrically mounted on the respective vehicles. Furthermore, all of the illumination devices are usually oriented such that they shine symmetrically to the respective vehicle center, in particular viewed in vehicle height direction or in vertical direction. For example, low beam distributions always shine straight in horizontal direction from the illumination devices. This is partially dictated by a respective legislation since different light values for example have to be separately satisfied per headlight.

With the introduction of pixel light sources such as for example DMD (Digital Micro Mirror Device, also known as DLP—Digital Light Processing) or μ-AFS (micro AFS, also known by micro LED or HD-SSL), new possibilities and challenges of light pattern imaging arise. Thus, projections on the road or on the previously mentioned wall can for example be presented, however, wherein it occurs that the light patterns of the headlights overlap. The known illumination devices in particular have the disadvantage that possible adjustment errors at the individual headlights are particularly fast visible upon the projection of symbols onto the road since respective separating edges of the light patterns or of image dots forming the light patterns and also referred to as pixels as well as superpositions of the pixels are particularly well apparent. This usually also causes a dark region between the two light patterns on the road. In addition, a distortion arises by the projection onto the road, which can result in a dark separating strip between the light patterns or between the regions illuminated by the light patterns.

Now, in order to avoid the disadvantages of the horizontal overlap, it is provided that the light patterns are arranged at least partially one above the other in vertical direction.

In an embodiment, in simultaneously providing the light patterns, the first light pattern in itself, that is considered on its own, has a first height extending in vertical direction, wherein the second light pattern in itself has a second height extending in vertical direction.

In order to therein be able to particularly advantageously illuminate the environment, it is provided in a further configuration that the first part of the first light pattern extends over more than half of the first height, in particular over the entire first height, in vertical direction. In particular, the headlight device allows that the light patterns or the headlights can take over different tasks. Thus, a road or a road part of a road located in front of the vehicle in vehicle longitudinal direction, along which the vehicle travels or on which the vehicle stands, can for example be illuminated by the second light pattern, in particular such that at least one symbol can be projected onto the road part by the light pattern. Therein or meanwhile, it is possible to realize a high beam and thus a far illumination and/or to illuminate regions, which are arranged above the road in vertical direction, for example by the first light pattern.

A further embodiment is characterized in that the part of the second light pattern extends over more than half of the second height, in particular over the entire second height, in vertical direction. Thereby, a particularly adequate and advantageous illumination of the environment can be presented.

It is conceivable that the light patterns, in particular considered composed, result in an overall light pattern, or else the light patterns are independent or non-contiguous light patterns It has proven particularly advantageous if the light patterns mutually overlap in vertical direction, in particular related to the or on the surface, in respective overlap regions. In other words, it is for example provided that respective overlap regions of the light patterns mutually overlap in vertical direction such that both the overlap region of the first light pattern and thus a further part of the first light pattern and simultaneously the overlap region of the second light pattern and thus a further part of the second light pattern are arranged for example in a third light pattern region. Therein, the first part for example adjoins to the overlap regions towards the top in vertical direction, and the second part of the second light pattern for example adjoins to the overlap regions towards the bottom in vertical direction.

Therein, it has proven particularly advantageous if the overlap regions have respective extents extending in vertical direction. In order to therein be able to realize a particularly advantageous illumination, it may be provided that the extent of the overlap region of the first light pattern is at most 30 percent, in particular at most 20 percent or at most 10 percent of the first height. Alternatively or additionally, it is provided that the extent of the overlap region of the second light pattern is at most 30 percent, in particular at most 20 percent or at most 10 percent of the second height.

In order to be able to realize a particularly advantageous and adequate illumination of the environment, it is provided in a further configuration that one of the light patterns has a polygonal or round, uninterrupted, contiguous light area, wherein surrounding of an area unilluminated, that is not illuminated by the headlight device, by the one light pattern is omitted. Within the scope of this disclosure—unless otherwise stated—by an unilluminated area, such an area is to be understood, which is not illuminated by the headlight device. The other light pattern includes at least a bent or curved partial region, which surrounds an unilluminated area, in particular such that the unilluminated area is only partially or else completely circumferentially surrounded by the curved or bent partial region in circumferential direction of the area. Thus, different functions are assigned to the light patterns and thus to the headlights. For example, while the one light pattern, in particular the first light pattern, is used to realize a particularly large-area illumination of the environment and therein for example a high beam illumination or a high beam distribution, the other light pattern, in particular the second light pattern, is for example used to for example project the partial region onto the road or onto the previously mentioned plane. Hereto, the other light pattern for example includes at least one symbol such as for example a ring or multiple rings intermeshing or entangled with each other or overlapping each other and/or at least one number. Thus, it is for example possible to project at least one information onto the road or onto the plane by the other light pattern, wherein this information can for example be optically perceived by the driver of the vehicle, in particular while a large-area lighting or illumination of the environment can be realized by the one light pattern.

For example, the module is a digital module, by which the light and thus the light pattern can be, in particular digitally, generated or provided.

The headlights may be identical or identical in construction, but therein oriented or arranged such that the first light pattern is at least partially arranged above the second light pattern in vertical direction. In particular, the headlight device allows, for example, realizing or implementing high beam and/or cornering light by one of the headlights and thus by one of the light patterns of the one headlight, while for example a low beam is realized by the other light pattern and thus by the other headlight and thus low beam values are satisfied and/or at least a digital projection onto the road is generated, in particular such that the symbol and the number, respectively, are projected onto the road. By the respective digital projection, for example a construction site light or a symbol of a construction site light is to be understood to warn the driver of a construction site and/or to illuminate a construction site. Further, the digital projection can include an optical warning notice, that is an optical warning signal, by which the driver of the vehicle is for example warned of a dangerous situation such as for example of slipperiness. Further, the digital projection can include at least one driver assistance information to assist the driver in driving the vehicle.

Alternatively or additionally, the following functions also referred to as light functions can be realized by the light patterns and thus by the headlight device: Basically, many different light distributions are conceivable. Alternatively or additionally to the above described cornering light, the following light functions can for example be realized by the headlight device for example formed as a digital module: A first one of the light functions is a so-called city light. Here, the bright-dark boundary, in particular between the respective light pattern and an environment unilluminated, that is not illuminated by the headlight device, adjoining thereto, is adapted, in particular with respect to a so-called highway light to keep glare of other traffic participants by the headlights in a city well illuminated by stationary illumination as low as possible. Therein, a reduction of the lighting range is thus for example provided. A second one of the light functions is the so-called highway light. Here, the bright-dark boundary is raised, in particular with respect to the city light, to have a larger range during highway driving, in particular with respect to the city light, in which the bright-dark boundary is for example lowered with respect to the highway light. A third one of the functions is a so-called bad weather light. Here, a part of the light distribution is masked out in order to not or not excessively glare the oncoming traffic in case of wet roadway. A fourth one of the light functions is a so-called constructions site light and/or lane guidance light. Here, the vehicle width is projected onto the ground by a carpet defined in width or corresponding lines along the direction of travel to allow a better lane guidance in case of low lane width. Alternatively or additionally, many further light patterns and light functions are conceivable—both in the high beam area and in the road projection area, also in combined manner At least one of the headlights may be formed to represent or to project the light pattern or the symbol of the light pattern capable of being provided by the at least one headlight or the symbol projectable or projected by the light pattern with a positive contrast or with a negative contrast. By the positive contrast, it is to be understood that the symbol is a bright symbol on dark background or that the symbol is inherently bright and therein for example a part of the light pattern and regions darker with respect to the symbol adjoin to the symbol. The dark regions are for example parts of the light pattern, that is regions illuminated by the light, but darker than the symbol, or the dark regions are regions unilluminated, that is not illuminated by light provided by the headlights, and thus for example not parts of the respective light pattern.

By the negative contrast, it is to be understood that the symbol is quasi a dark symbol on bright background or that the symbol is inherently dark and regions brighter with respect to the symbol adjoin to the symbol, which are for example parts of the light pattern and thus regions illuminated by the light. The dark symbol is for example a part of the light pattern, that is a region illuminated by the light, but darker than the bright regions, or the dark symbol is a region unilluminated, that is not illuminated by light provided by the headlights and thus for example not a part of the respective light pattern.

A second aspect relates to a vehicle, e.g., a motor vehicle, in particular a car, such as a passenger car, which includes at least one headlight device, in particular according to the first aspect. The headlight device includes, in particular at least or exactly, two headlights spaced apart from each other in vehicle transverse direction, which are formed to simultaneously provide a respective light pattern.

Now, in order to realize a particularly advantageous illumination of at least a part of an environment of the vehicle, it is provided in the second aspect that in simultaneous provision of the light patterns, a first one of the light patterns is arranged at least partially above the second light pattern in vertical direction. The respective headlight is a pixel light source formed as a light module such that the respective light pattern can be formed by a plurality of image dots, which can be provided by the respective headlight, wherein the respective headlight includes a plurality of LEDs, by which the image dots can be generated. Advantages and advantageous configurations of the first aspect are to be regarded as advantages and advantageous configurations of the second aspect and vice versa.

In order to be able to particularly advantageously illuminate the environment in particularly simple manner, it is provided in an embodiment of the second aspect that the headlights are immovable in relation to a structure of the vehicle for example formed as a self-supporting body, the passenger compartment of which is delimited by the structure. Thus, the headlights are not pivotable headlights, but immovable, that is fixed in structure, in relation to the structure.

The light patterns can be equally wide, that is have the same width, in vehicle transverse direction. Further, it is conceivable that one of the light patterns is narrower than the other light pattern, such that the width of the one light pattern is lower than the width of the other light pattern. Therein, it may be provided that the one light pattern then does not protrude beyond the other light pattern neither in vehicle transverse direction to the left nor in vehicle transverse direction to the right.

A third aspect relates to a method for operating a headlight device, in particular according to the first aspect, of a vehicle, in particular according to the second aspect. The headlight device of the vehicle in the third aspect includes, in particular at least or exactly, two headlights spaced apart from each other in vehicle transverse direction, which simultaneously provide a respective light pattern.

Now, in order to be able to illuminate the environment of the vehicle in particularly advantageous manner, it is provided in the third aspect that in simultaneous provision of the light patterns, a first one of the light patterns is arranged at least partially above the second light pattern in vertical direction. The respective headlight is a pixel light source formed as a light module such that the respective light pattern is formed by a plurality of image dots, which are provided by the respective headlight, wherein the respective headlight includes a plurality of LEDs, which generate the image dots. Advantages and advantageous configurations of the first aspect and of the second aspect are to be regarded as advantages and advantageous configurations of the third aspect and vice versa.

In order to be able to particularly advantageously illuminate the environment, it may be provided that different functions are assigned to the headlights or the headlights satisfy different functions. Therein, it has proven particularly advantageous if in cornering of the vehicle, one of the light patterns is moved in relation to the structure of the vehicle, in particular following the curve, while a movement of the other light pattern effected in relation to the structure is omitted and, e.g., while a movement of the headlights in themselves effected in relation to the structure is omitted. Thus, the one light pattern is used to realize a cornering light, but without moving, in particular pivoting, the headlight providing the one light pattern in relation to the structure. In or during the realization of the cornering light, the other light pattern can be used to particularly advantageously illuminate the environment and for example to provide the driver with information, which is projected outside of the vehicle and thus in the environment thereof, in particular onto the road. Thus, it is in particular provided in the embodiment, in cornering, to dynamically generate a movement only from one of the headlights and thus to only move the one light pattern, while a movement of the other light pattern in relation to the structure is omitted. The following advantages can in particular be realized:

- A symbol projection onto the road can be clearly separated from a projection of a bright-dark boundary and a dynamic high beam;
- simpler control and synchronization in symbol projection;
- considerably higher illumination intensities realizable with existing micro LED light sources or other light sources, wherein known micro LED sources and pixel light sources, respectively, for example have aspect ratios of 4:1 and 3:1, respectively; and
- thereby, only one headlight variant becomes required since identical or identically constructed headlights can for example be used both for using in right-hand traffic and for using in left-hand traffic.

A technical implementation is for example effected in particular such that lighting technology modules of the headlights are equally mounted in both headlights. Only by an orientation of the modules, a different illumination region can be implemented such that the first light pattern is arranged at least partially above the second light pattern in vertical direction.

Developments of the vehicle and the method include features as they have already been described in context of the developments of the headlight device. For this reason, the corresponding developments of the vehicle and the method are not again described here.

The motor vehicle may be configured as a motor vehicle, such as a car, in particular as a passenger car or truck, or as a passenger bus or motorcycle. Combinations of the features of the described embodiments are also possible.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a schematic representation of a light pattern, which can be generated or is generated by a headlight device in particular on or at a vertical and flat surface, in particular a wall, wherein FIG. 1 shows a first variant of the light pattern;

DETAILED DESCRIPTION

In the embodiments, the described components of the embodiments each represent individual features to be considered independently of each other, which also each develop the headlight device independently of each other. Therefore, the disclosure is to include also combinations of the features of the embodiments different from the illustrated ones. Furthermore, the described embodiments can also be supplemented by further ones of the already described features.

In the figures, identical reference characters each denote functionally identical elements.

Figure 1:
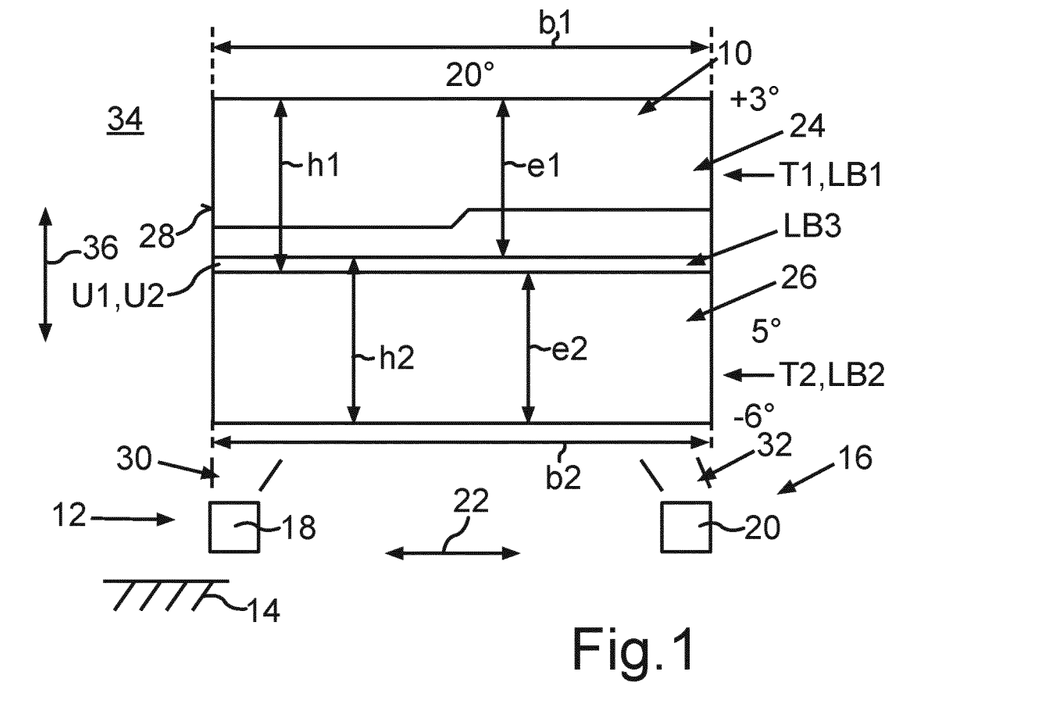

FIG. 1 shows a first variant of an overall light pattern 10 in a schematic representation, which for example can be generated or is generated on or at a vertical, flat surface, in particular a wall, by a headlight device 12 of a vehicle particularly schematically illustrated in FIG. 1. The vehicle may be formed as a motor vehicle, in particular as a car, and includes a passenger compartment also referred to as interior for occupants, who can be located in the passenger compartment during a travel of the vehicle. Therein, the passenger compartment is delimited by a structure of the vehicle in particular formed as a self-supporting body, wherein the structure is shown in part and in particularly schematic manner and denoted by 14 in FIG. 1. In the embodiment shown in FIG. 1, the headlight device 12, which is also referred to as illumination device, is arranged on the front 16 of the vehicle. The headlight device 12 includes two headlights 18 and 20, which are thus formed as front headlights. Therein, FIG. 1 shows an installation position of the headlight device 12, which occupies its installation position in completely produced state of the vehicle and in particular if the vehicle stands on a horizontal plane and therein for example on a horizontal road or travels along the plane or road. From FIG. 1, it is apparent that the headlights 18 and 20 are spaced apart from each other in vehicle transverse direction, wherein the vehicle transverse direction is illustrated by a double arrow 22 in FIG. 1. The headlight 18 is formed to provide a first light pattern 24. The headlight 20 is formed to provide a second light pattern 26. From FIG. 1, it is apparent that the headlights 18 and 20 are formed to simultaneously provide the light patterns 24 and 26. Based on FIGS. 1 to 3, a method for operating the headlight device 12 is also described. In the method, the headlights 18 and 20 simultaneously provide their light patterns 24 and 26. For example, the light patterns 24 and 26 form the overall light pattern 10 such that the light patterns 24 and 26 are for example generated or provided at or on the previously mentioned surface denoted by 28 in FIG. 1, which is for example formed by a wall. In other words, for providing and thus generating the light pattern 24, the headlight 18 provides light 30, which is radiated by the headlight 18. The headlight 18 radiates the light 30 against the surface 28 such that the light pattern 26 is generated, that is provided, by the headlight 18 on the surface 28. Accordingly, the headlight 20 provides light 32, which is provided or radiated and in particular radiated against the surface 28 by the headlight 20. Therein, the light 32 forms the light pattern 26 on or at the surface 28. The respective headlight 18 and 20, respectively, may be a so-called pixel light source. Hereby, it is in particular to be understood that the respective light pattern 24 and 26, respectively, is formed by respective pixels also referred to as image dots, which are provided and therein radiated and in particular presently radiated against the surface 28 by the respective headlight 18 and 20, respectively. Thus, the respective headlight 18 and 20, respectively, is a respective digital light module or the respective headlight 18 and 20, respectively, includes such a respective digital light module, which is for example arranged in the respective headlight 18 and 20, respectively, or in a respective housing of the respective headlight 18 and 20, respectively. Thus, the light 30 and 32, respectively, for example is digital light, such that the first light pattern 24 is for example a first digital light portion and the second light pattern 26 is a second digital light portion.

The vertical surface 28 extends perpendicularly to the horizontal direction and is for example spaced apart from the vehicle, in particular from the front 16 of the vehicle, or from the respective headlight 18 and 20, respectively, by at least five meters, in particular at least or exactly ten meters, in horizontal direction or in vehicle longitudinal direction, which for example coincides with the horizontal direction. Therein, it is in particular conceivable that the headlights 18 and 20 are arranged at the same level in vehicle longitudinal direction or in horizontal direction such that the headlights 18 and 20 are for example equidistant from the surface 28 in horizontal direction or in vehicle longitudinal direction. The light patterns 24 and 26, which are generated on or at the surface 28 by the headlights 18 and 20 in the described manner, can for example be optically perceived by the occupants located in the passenger compartment and thus in particular by the driver of the vehicle.

It is apparent that the surface 28 is arranged outside of the passenger compartment and therein outside of the vehicle and is for example arranged in front of the vehicle in vehicle longitudinal direction. Thus, the surface 28 is arranged in an environment of the vehicle denoted by 34 in FIG. 1 such that the light patterns 24 and 26 are also arranged or generated in the environment 34.

Now, in order to be able to particularly advantageously and in particular particularly adequately illuminate the environment 34, in simultaneously providing the light patterns 24 and 26, the light pattern 24 is arranged at least partially above the second light pattern 26 in vertical direction or in vehicle height direction, which for example coincides with the vertical direction. Therein, the vertical direction is illustrated by a double arrow 36 in FIG. 1. In the embodiment shown in FIG. 1, a first part T of the light pattern 24 is arranged above a second part T2 of the second light pattern 26 in vertical direction, wherein the first part T1 is arranged in a first light pattern region LB1 and the second part T2 is arranged in a second light pattern region LB2. Therein, the first light pattern region LB1 is free from the second light pattern 26 and the light pattern region LB2 is free from the first light pattern 24. This means that the light pattern 26 is not arranged in the light pattern region LB1 and the light pattern 24 is not arranged in the light pattern region LB2.

The first light pattern 24 in itself has a first height h1 extending in vertical direction, wherein the second light pattern 26 in itself has a second height h2 extending in vertical direction. The part T1 of the light pattern 24 arranged above the light pattern 26 in vertical direction and thus adjoining to the light pattern 26 in vertical direction towards the top has a first extent e1 extending in vertical direction, which is more than half of the height h1. Thus, the part T1 extends over more than half of the first height h1. Correspondingly, the second part T2 of the light pattern 26 arranged below the light pattern 24 in vertical direction and thus adjoining to the light pattern 24 in vertical direction towards the bottom has a second extent e2 extending in vertical direction, which is more than half of the second height h2. Thus, the second part T2 extends over more than half of the second height h2.

For example related to a horizontal reference plane, which extends perpendicularly to the surface 28 and for example extends through the center of the vehicle or through the center of the front 16 of the vehicle related to the vehicle height direction or to the vertical direction, and in particular in view of the fact that the respective light 30 and 32, respectively, conically extends away from the respective headlight 18 and 20, respectively, at least related to the vertical direction, the light pattern 26 for example extends from −6 degrees in vertical direction to the top up to +1 degree, while the light pattern 24 for example extends from −2 degrees in vertical direction to the top up to +3 degrees. A respective extent of the respective light pattern 24 and 26, respectively, in horizontal direction and thus in vehicle transverse direction to the left and right is for example 20 degrees. In the embodiment shown in FIG. 1, the first light pattern 24 in itself has a first width b extending in vehicle transverse direction, wherein the second light pattern 26 in itself has a second width b2 extending in vehicle transverse direction. Therein, it is presently provided that the widths b1 and b2 are identical. Therein, the part T1 arranged above the second part T2 in vertical direction extends over the entire width b1, such that the part T1 is arranged above the part T2 or the light pattern 26 in vertical direction over the entire width b1. The part T2 extends over the entire width b2 such that the part T2 is arranged below the part T1 or the light pattern 24 in vertical direction over the entire width b2. Furthermore, it is provided in the embodiment shown in FIG. 1 that respective overlap regions U1 and U2 of the light patterns 24 and 26 overlap in vertical direction. This means that both the overlap region U1 of the light pattern 24 and the overlap region U2 of the light pattern 26 are arranged in a light pattern region LB3 common to the overlap regions U1 and U2 at the same time. Therein, the part T1 adjoins to the overlap regions U1 and U2 in vertical direction towards the top and the part T2 adjoins thereto in vertical direction towards the bottom.

Figure 2:
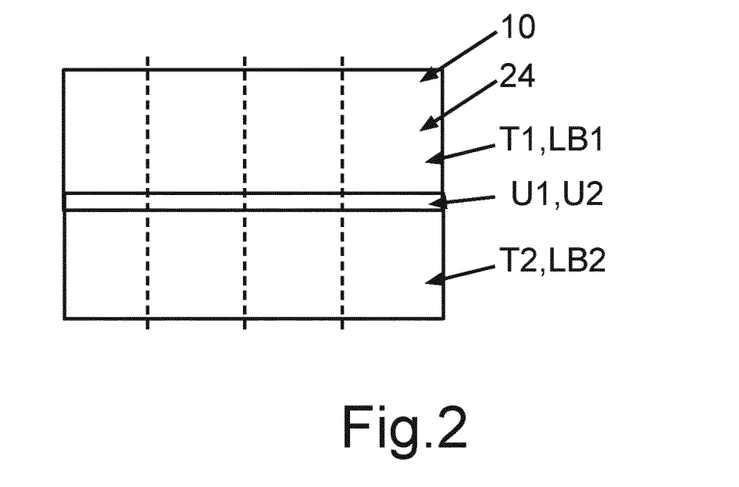
FIG. 2 is a schematic representation of a second variant of the light pattern.

FIG. 2 shows a second variant of the overall light pattern 10. The second variant for example differs from the first variant in that in the second variant, the overlap regions U1 and U2 are for example larger or higher in vertical direction than in the first variant. For example, the overlap regions U1 and U2 extend over 1.5 degrees to 5 degrees, in particular over 1.5 degrees, over 3 degrees or over 5 degrees.

Related to the previously mentioned plane or road, on which the vehicle for example stands, the light pattern 26, in particular the part T2, is for example at least predominantly, in particular completely, shined onto the plane, while the light pattern 24, in particular the part T1, is at least predominantly, in particular completely, arranged above the road in vertical direction.

As a result, it is possible to assign respective, individual functions to the respective headlights 18 and 20. Herein, the light pattern 24 is for example used to illuminate regions arranged above the road and/or to realize a high beam illumination or a high beam, while the light pattern 26 is for example used to project at least one symbol and/or at least one number and thus for example driver assistance information onto the road, by which the driver can be assisted in driving the vehicle. Therein, it is in particular possible to avoid wet reflections, for example by the light pattern 26. For example, wet regions of the road also referred to as roadway can be masked out, that is not illuminated and thus remain unilluminated to avoid reflections resulting from a possible illumination of these wet regions and thus glares of the driver.

Alternatively to the embodiments shown in FIGS. 1 and 2, in which the light patterns 24 and 26 mutually overlap in vertical direction, it can be provided that a mutual overlap of the light patterns 24 and 26 is omitted.

Figure 3:
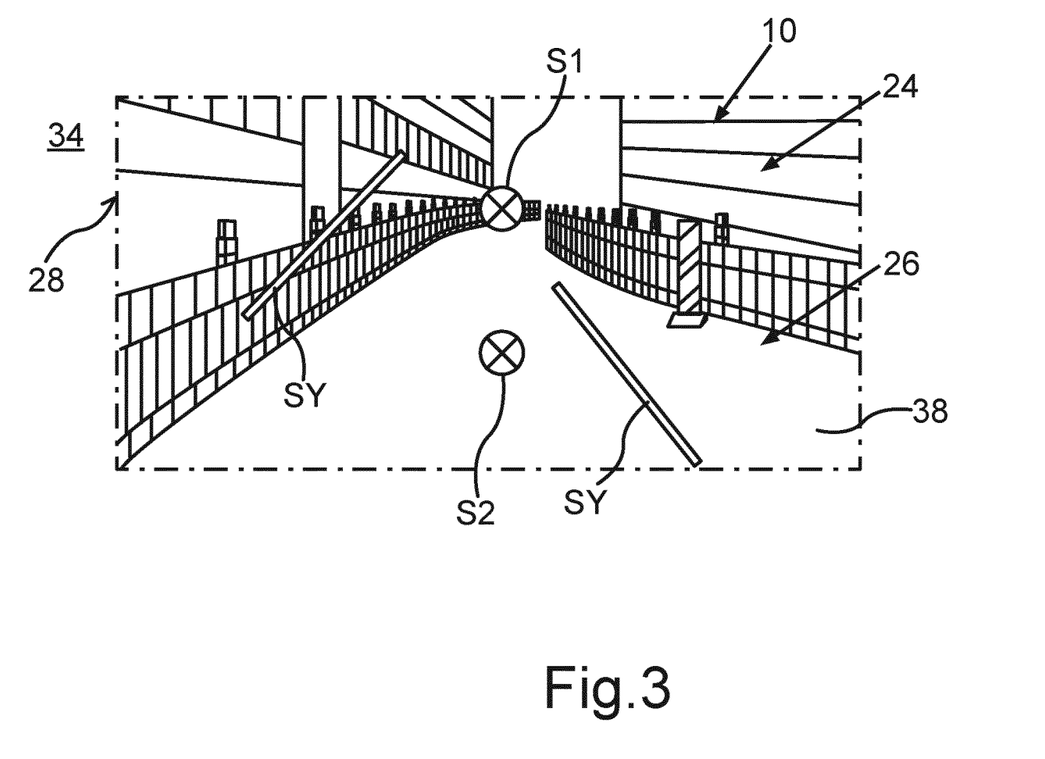
FIG. 3 is a schematic representation of a third variant of the light pattern.

Finally, FIG. 3 shows a third variant of the overall light pattern 10 or of the light patterns 24 and 26. In FIG. 3, a first centroid of an area of the first light pattern 26 is denoted by S1 and a second centroid of an area of the light pattern 26 is denoted by S2. Therein, it is provided that in that the light pattern 24 is arranged at least partially above the light pattern 26 in vertical direction, the centroid of an area S1 is arranged above the centroid of an area S2 in vertical direction. Thereby, a particularly advantageous illumination of the environment 34 can be realized. In particular, it is for example conceivable to project symbols denoted by SY in FIG. 3 onto the road denoted by 38 in FIG. 3 and/or against the surface 28 to for example assist the driver in driving the vehicle. Thus, while one of the light patterns 24 and 26 is for example an extensive, for example fully extensive, light pattern, which does not surround an unilluminated region, the other light pattern 26 or 24 includes symbols such as for example rings and thus for example at least one curved or arcuate partial region, which for example at least partially, in particular completely circumferentially, surrounds an unilluminated region. Thereby, a particularly advantageous and adequate illumination of the environment 34 can be ensured.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A headlight device for a vehicle, comprising
two headlights, spaced apart from each other in a vehicle transverse direction in an installation position of the headlight device, configured to simultaneously provide a respective light pattern, each headlight including light emitting diodes providing a pixel light source formed as a light module, such that the respective light pattern is formed by image dots, provided by the respective headlight in simultaneously providing the light patterns, a first light pattern is arranged at least partially above a second light pattern in a vertical direction related to the installation position of the headlight device, a first part of the first light pattern being arranged above a second part of the second light pattern in the vertical direction, the first part being arranged in a first light pattern region and the second part being arranged in a second light pattern region, the first light pattern region being free from the second light pattern and the second light pattern region being free from the first light pattern, the first light pattern having a first width extending in the vehicle transverse direction and the second light pattern having a second width equal to the first width and extending in the vehicle transverse direction, the first and second parts respectively extending over all of the first and second widths, and the first and second light patterns mutually overlapping in the vertical direction in first and second overlap regions, respectively, wherein the first and second overlap regions each have an extent extending in the vertical direction.

2. The headlight device according to claim 1, wherein the first light pattern has a first height extending in the vertical direction and the second light pattern has a second height extending in the vertical direction.

3. The headlight device according to claim 2,
wherein at least one of the extent of the first overlap region of the first light pattern is at most 30% of the first height, and the extent of the second overlap region of the second light pattern is at most 30% of the second height.

4. The headlight device according to claim 3, wherein at least one of the extent of the first overlap region of the first light pattern is at most 20% of the first height, and the extent of the second overlap region of the second light pattern is at most 20% of the second height.

5. The headlight device according to claim 3, wherein at least one of the extent of the first overlap region of the first light pattern is at most 10% of the first height, and the extent of the second overlap region of the second light pattern is at most 10% of the second height.

6. The headlight device according to claim 3, wherein one of the first and second light patterns is one of a polygonal and round, uninterrupted, contiguous light area producing a first unilluminated area; and another of the first and second light patterns has at least one bent or curved partial region which surrounds a second unilluminated area.

7. The headlight device according to claim 1, wherein one of the first and second light patterns is one of a polygonal and round, uninterrupted, contiguous light area producing a first unilluminated area; and another of the first and second light patterns has at least one bent or curved partial region which surrounds a second unilluminated area.

8. A vehicle, comprising:
a body, and
at least one headlight device installed in the body, including two headlights, spaced apart from each other in a vehicle transverse direction in an installation position of the headlight device, configured to simultaneously provide a respective light pattern, each headlight including light emitting diodes providing a pixel light source formed as a light module, such that the respective light pattern is formed by image dots, provided by the respective headlight in simultaneously providing the light patterns, a first light pattern is arranged at least partially above a second light pattern in a vertical direction related to the installation position of the headlight device, a first part of the first light pattern being arranged above a second part of the second light pattern in the vertical direction, the first part being arranged in a first light pattern region and the second part being arranged in a second light pattern region, the first light pattern region being free from the second light pattern and the second light pattern region being free from the first light pattern, the first light pattern having a first width extending in the vehicle transverse direction and the second light pattern having a second width equal to the first width and extending in the vehicle transverse direction, the first and second parts respectively extending over all of the first and second widths, and the first and second light patterns mutually overlapping in the vertical direction in first and second overlap regions, respectively, wherein the first and second overlap regions each have an extent extending in the vertical direction.

9. The vehicle according to claim 8, wherein the first light pattern has a first height extending in the vertical direction and the second light pattern has a second height extending in the vertical direction.

10. The vehicle according to claim 8,
wherein at least one of the extent of the first overlap region of the first light pattern is at most 30% of the first height, and the extent of the second overlap region of the second light pattern is at most 30% of the second height.

11. The vehicle according to claim 8, wherein at least one of the extent of the first overlap region of the first light pattern is at most 20% of the first height, and the extent of the second overlap region of the second light pattern is at most 20% of the second height.

12. The vehicle according to claim 8, wherein one of the first and second light patterns is one of a polygonal and round, uninterrupted, contiguous light area producing a first unilluminated area; and another of the first and second light patterns has at least one bent or curved partial region which surrounds a second unilluminated area.

13. The vehicle according to claim 8,
wherein the headlights are immovable in relation to the body of the vehicle,
wherein the vehicle further comprises a passenger compartment delimited by the body of the vehicle.

14. A method for operating a headlight device of a vehicle, the headlight device having two headlights spaced apart in a vehicle transverse direction, the method comprising:
simultaneously producing a respective light pattern the from a pixel light source of LEDs in a light module of each of the headlights, the respective light pattern formed as image dots, with a first light pattern arranged at least partially above a second light pattern in a vertical direction, a first part of the first light pattern being arranged above a second part of the second light pattern in the vertical direction, the first part being arranged in a first light pattern region and the second part being arranged in a second light pattern region, the first light pattern region being free from the second light pattern6) and the second light pattern region being free from the first light pattern, the first light pattern having a first width extending in the vehicle transverse direction and the second light pattern having a second width equal to the first width and extending in the vehicle transverse direction, the first and second parts extending over all of the first and second widths, and the first and second light patterns mutually overlapping in the vertical direction in first and second overlap regions, respectively, wherein the first and second overlap regions each have an extent extending in the vertical direction.

15. The method according to claim 14, further comprising moving, during cornering of the vehicle, one of the first and second light patterns in relation to a structure of the vehicle defining a passenger compartment of the vehicle, while preventing movement of another of the first and second light patterns.

* * * * *

UNITED STATES PATENT AND TRADEMARK OFFICE
CERTIFICATE OF CORRECTION

| | |
|---|---|
| PATENT NO. | : 11,850,995 B2 |
| APPLICATION NO. | : 17/924468 |
| DATED | : December 26, 2023 |
| INVENTOR(S) | : Carsten Funke et al. |

It is certified that error appears in the above-identified patent and that said Letters Patent is hereby corrected as shown below:

In the Claims

Column 14, Lines 14-16:
In Claim 14, after "pattern" delete "the".

Column 14, Line 25:
In Claim 14, delete "pattern6)" and insert --pattern--.

Signed and Sealed this
Twentieth Day of February, 2024

Katherine Kelly Vidal
*Director of the United States Patent and Trademark Office*